US 6,696,659 B1

(12) United States Patent
Wallace et al.

(10) Patent No.: US 6,696,659 B1
(45) Date of Patent: Feb. 24, 2004

(54) METHOD OF FORMING A MOLD FOR A GOLF CLUB GRIP

(75) Inventors: Justin Q. Wallace, Southern Pines, NC (US); James W. Thompson, Jr., Carthage, NC (US)

(73) Assignee: Southeastern Tool & Die Company, Inc., Aberdeen, NC (US)

( * ) Notice: Subject to any disclaimer, the term of this patent is extended or adjusted under 35 U.S.C. 154(b) by 0 days.

(21) Appl. No.: 10/400,841

(22) Filed: Mar. 27, 2003

Related U.S. Application Data (62) Division of application No. 09/773,900, filed on Jan. 31, 2001.

(51) Int. Cl.[7] .............................. B23H 1/00; B23H 9/12; B23H 7/20
(52) U.S. Cl. ...................................... 219/69.17; 700/166
(58) Field of Search ........................ 219/69.17; 700/166

(56) References Cited

U.S. PATENT DOCUMENTS

| | | | | |
|---|---|---|---|---|
| 2,604,660 A | * | 7/1952 | Karns | 264/278 |
| 2,704,668 A | * | 3/1955 | Park | 473/300 |
| 2,850,767 A | * | 9/1958 | Ford | 264/275 |
| 4,734,173 A | * | 3/1988 | Walter et al. | 219/69.17 |
| 4,947,016 A | * | 8/1990 | Puyplat | 219/69.17 |
| 5,247,151 A | * | 9/1993 | Hagerman | 219/69.17 |
| 5,406,043 A | * | 4/1995 | Banji | 219/69.17 |

FOREIGN PATENT DOCUMENTS

| | | | |
|---|---|---|---|
| EP | 0 573 900 A1 | * | 12/1993 |
| EP | 573900 A1 | * | 12/1993 |
| GB | 2268114 A | * | 1/1994 |
| JP | 3-112575 A | * | 5/1991 |
| JP | 03-112575 A | * | 5/1991 |
| JP | 8-155966 A | * | 6/1996 |
| JP | 08-155966 | * | 6/1996 |

\* cited by examiner

Primary Examiner—Geoffrey S. Evans
(74) Attorney, Agent, or Firm—Coats & Bennett, PLLC (57) ABSTRACT

A method for forming a negative image of a golf club grip design in a golf club grip mold cavity includes translating an initial golf club grip design to an electric discharge machine electrode, cutting the design into the electrode surface, and rotating and translating the electrode within the mold cavity while engaging in electric discharge machining. The translation from the initial golf club grip design to the electrode includes cordally scaling the design elements such that their cordal relationship is preserved when the design is subsequently formed into the grip mold cavity. In another aspect, a data storage medium stores a program for forming a golf club grip design for the surface of an electric discharge machine electrode.

17 Claims, 6 Drawing Sheets

METHOD OF FORMING A MOLD FOR A GOLF CLUB GRIP

CROSS REFERENCE TO RELATED U.S. PATENT APPLICATION SER. NO. 09/773,900

This is a divisional application of U.S. patent application Ser. No. 09/773,900 filed Jan. 31, 2001 pending.

FIELD OF THE INVENTION

The present invention relates generally to mold machining, and in particular to a method and apparatus for forming a mold for golf club grips.

BACKGROUND OF THE INVENTION

There are approximately 26.4 million golfers in the United States. In 1999, these golfers spent $5.9 billion on equipment, $2.5 billion of which was spent on golf clubs alone. One component of this significant market is the rubber grip that covers the end of each golf club. In addition to the grip attached to each new golf club sold, a large independent golf club grip market exists, as many golfers have the grips on their golf clubs replaced periodically.

A typical golf club grip is cast from rubber in a mold. It is hollow, to fit over the end of the golf club, with a constant internal diameter, typically about 0.580 or 0.600 inches. The golf club grip is generally cylindrical in overall shape, tapering from a larger diameter at the end, or cap, to a diameter only slightly greater than that of the golf club shaft at the mouth.

A variety of designs may be formed into the surface of the golf club grip as indentations, or voids. These designs are typically cast into place by operation of a corresponding raised or "negative" image of the design on the surface of the golf club cavity. These designs usually include the name and/or logo of the golf club manufacturer, a brand name identifying the model or line of golf club, and other identifying information. Additionally, the bulk of the surface area of the golf club grip may contain an array of texture features—curves, crosses, stars, chevrons, and the like—formed therein. These patterns provide both aesthetic appeal and facilitate the golfer's grip on the club. The entire surface design, including all brand names, logos, texture features and other design elements, may additionally be partially or completely filled with paint or other suitable pigment, thus providing a contrasting color to the design.

The molds for casting golf club grips are typically manufactured using a multi-step process resulting in a cast steel mold. Initially, a master golf club grip form, with the desired tapered shape and surface design formed therein, is fashioned from a suitable material, such as aluminum. Due to the shrink ratios and tolerance stacking inherent in the manufacturing process, the master form is proportionally larger than the desired final golf club grip. A mold of rubber or other suitable material is cast around the master form, and subsequently cut into halves, removed and reassembled to form a hollow mold. One of ordinary skill in the art will readily recognize that the surface design from the master form is cast into the rubber mold in a dimensionally negative image, i.e., the design features that exist as indentations or cuts into the surface of the master form, appear as raised features or protrusions in the inner surface of the rubber mold. A ceramic form is then cast in the rubber mold. The ceramic form resembles the original master form, but is proportionally smaller due to shrink ratios inherent in both the rubber and ceramic casting processes. The ceramic form, like the master form, contains the surface design features as indentations formed therein. A steel mold is subsequently cast around the ceramic form. The ceramic form is then broken and removed from the mold, and a plurality of golf club grips may be cast from the resulting steel mold.

While the above-described process is well understood and fairly easy to perform, it has significant drawbacks. As mentioned, each molding and casting entails an inherent shrink ratio by which the mold or cast product is slightly smaller than its parent form or mold. Thus, the dimensions of the desired final product—the golf club grip—must be scaled up to manufacture the master form, a process that is inexact and largely empirical. Additionally, the inherent inaccuracies of the casting process, particularly the steel casting of the final grip mold, results in a finished product wherein the quality of the surface design, i.e., the sharpness of the edges and corners of the surface design features, is degraded. Also, due to compounding registration errors at each casting step, the joints or seams where the various mold halves fit together must be buffed or otherwise reworked to remove joint lines. In severe cases, extensive buffing may be required, which will tend to occlude adjacent surface design features. The process is time consuming, and thus is not ameliorable to quick turn-around for new or different surface designs. The manufacturing process also suffers from a general lack of detail in the finished product surface design features, and a general lack of consistency between casting runs.

Electronic discharge machine (EDM) machining is well known in the metallurgical arts, and has long been recognized as applicable to the cutting of precise shapes, particularly those including embedded surface designs. In a typical mold cavity cutting application, the EDM process comprises cutting the negative image of a desired surface design into an electrode, usually made of graphite. A high electrical voltage is applied to the electrode, a corresponding ground is applied to the mold blank, and the two are separated by a dielectric fluid. As the electrode and mold blank are brought into close proximity (under the control of a numeric positioning unit), the dielectric fluid ionizes and becomes an electrical conductor, allowing a spark of current to flow across the gap. Like an arc welder, this high intensity spark erodes a small amount of material from the mold blank. Through the eroding action of many repeated sparks as the electrode is repositioned with respect to the mold blank, the mold blank is worn away until it assumes the negative of the size, shape, and surface design of the electrode.

EDM machining has heretofore proven unsuitable for machining golf club grip molds, however, due to the complex surface designs that must be reproduced, and particularly due to the taper in the grip's cylindrical shape. As will be explained below, to cut the surface design into the cavity, the EDM electrode must be of a smaller diameter than the desired cavity, and the electrode moved within the cavity, to impart the design equally across the mold cavity surface. Thus, the surface design as prepared for the golf club grip must be scaled before being formed into the smaller diameter EDM electrode, in such a manner that the dimensions and relative positions of design elements are preserved after the design is subsequently cut into a mold cavity. Typical Computer Aided Design (CAD) software accomplishes such scaling by "unwrapping" the 3-dimentional design into a flat, 2-dimentional form, applying a linear scaling factor in one or more dimensions, and then "wrapping" the scaled, flat design back to a 3-dimentional form. While this technique may work well for straight cylindrical shapes, it results in distortions when applied to a surface design on a tapered cylindrical shape. Hence, without a method of accurately mapping the golf club grip design image to a tapered electrode, EDM machining is incapable of accurately reproducing a design within a cavity, and thus the mold cannot subsequently produce accurate golf club grips.

SUMMARY OF THE INVENTION

The present invention entails a mold for casting golf club grips, the mold comprising a generally cylindrical cavity having at least one tapered portion, with the cavity including a negative image of a golf club grip design formed thereon by an electrical discharge machine.

In another aspect, the present invention relates to a method of transferring a design for a golf club grip comprising a plurality of design elements to an EDM electrode. The method comprises selecting two corresponding size parameters, a first parameter associated with a golf club grip design and a second parameter associated with the electrode, determining the ratio of the first size parameter to the second size parameter, scaling the design elements associated with the golf club grip design by a function of the ratio of size parameters in such a way that their cordal relationship is preserved, and transferring the scaled design to the electrode.

DETAILED DESCRIPTION OF THE INVENTION

The present invention entails a mold for casting golf club grips, wherein a surface design is inscribed in the cavity of the mold by Electric Discharge Machining (EDM). The present invention additionally entails a method of translating a gold club grip design to an EDM electrode in such a manner that the cordal relationship between design elements is preserved in the mold machining process.

Figures 1, 1A:
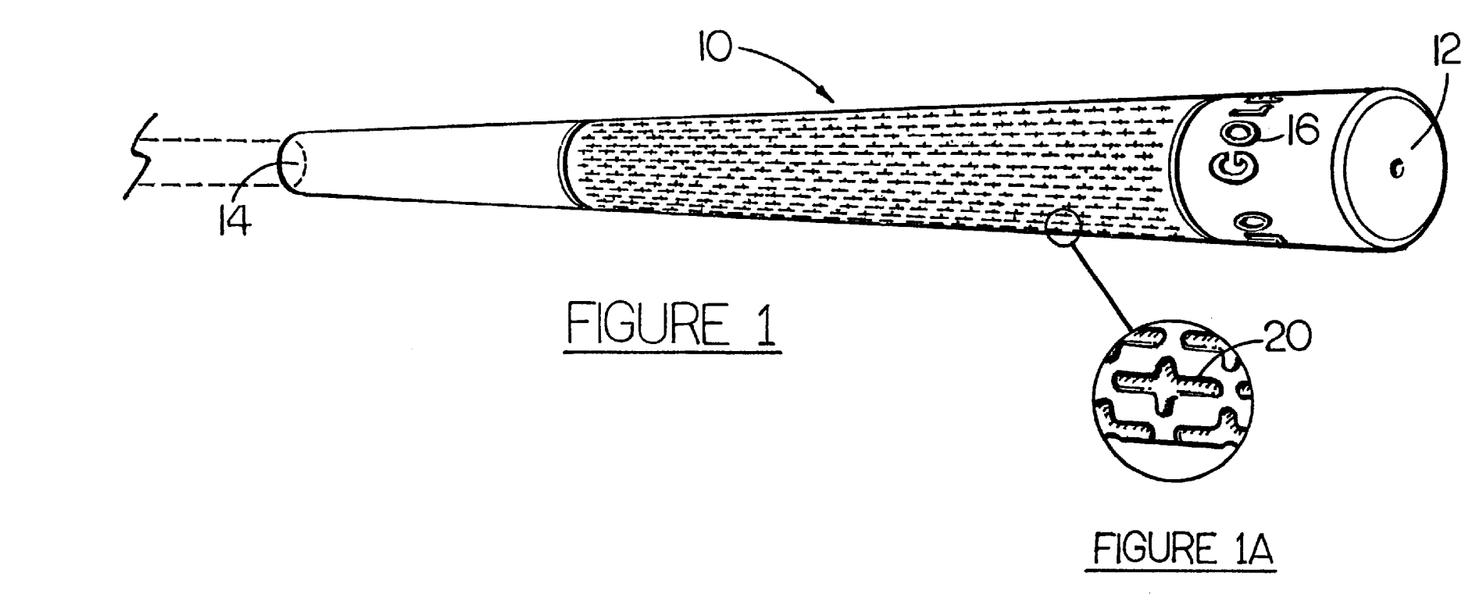
FIG. 1 is a perspective view of a golf club grip.
FIG. 1A is an enlarged view of one texture feature of a golf club grip, magnified to show its indentation into the surface of the grip.

Prior to a description of the mold manufacture and design translation processes of the present invention, a golf club grip manufactured according to the present invention is briefly reviewed. Such a grip is depicted in FIG. 1, and is indicated generally by the numeral 10. The golf club grip is generally cylindrical in shape and is tapered in at least one section from the cap end 12 to the smaller diameter mouth 14. Golf club grip 10 is cast from rubber or a similar suitable material.

Embedded in the surface of the golf club grip 10 is a plurality of design elements. These may include, for example, the brand name and/or logo of the manufacturer, as depicted at 16. The golf club grip design may additionally include a model name, trademark, or other identifier. In general, these design elements may be located anywhere on golf club grip 10, and may additionally be set off by lines, circles, and other markings.

Additionally, the surface design of golf club grip 10 may include an array of design elements in the form of texture features 20. Texture features 20 may, in general, assume any shape, such as crosses, hatches, chevrons, "S"-shaped elements, and the like. As depicted in FIGS. 1 and 1A, the texture features 20 comprise "cross" or "plus" shaped designs. As shown in FIG. 1A, these design elements are formed as indentations or voids within the surface of the golf club grip 10.

Following its casting, a contrasting paint or pigment is typically applied to the surface of the golf club grip 10. This pigment is formulated and applied such that it fills the indentations or voids comprising the surface design formed in the golf club grip 10, i.e., the logo 16, texture elements 20, and other elements which may comprise the golf club grip design. The golf club grip 10 is then buffed, thus removing the pigment or paint from the surface of the golf club grip 10, while retaining the paint within the indentations of the surface design. This visually distinguishes the surface design elements from the base color (typically black) of the golf club grip 10.

Figures 2, 2A:
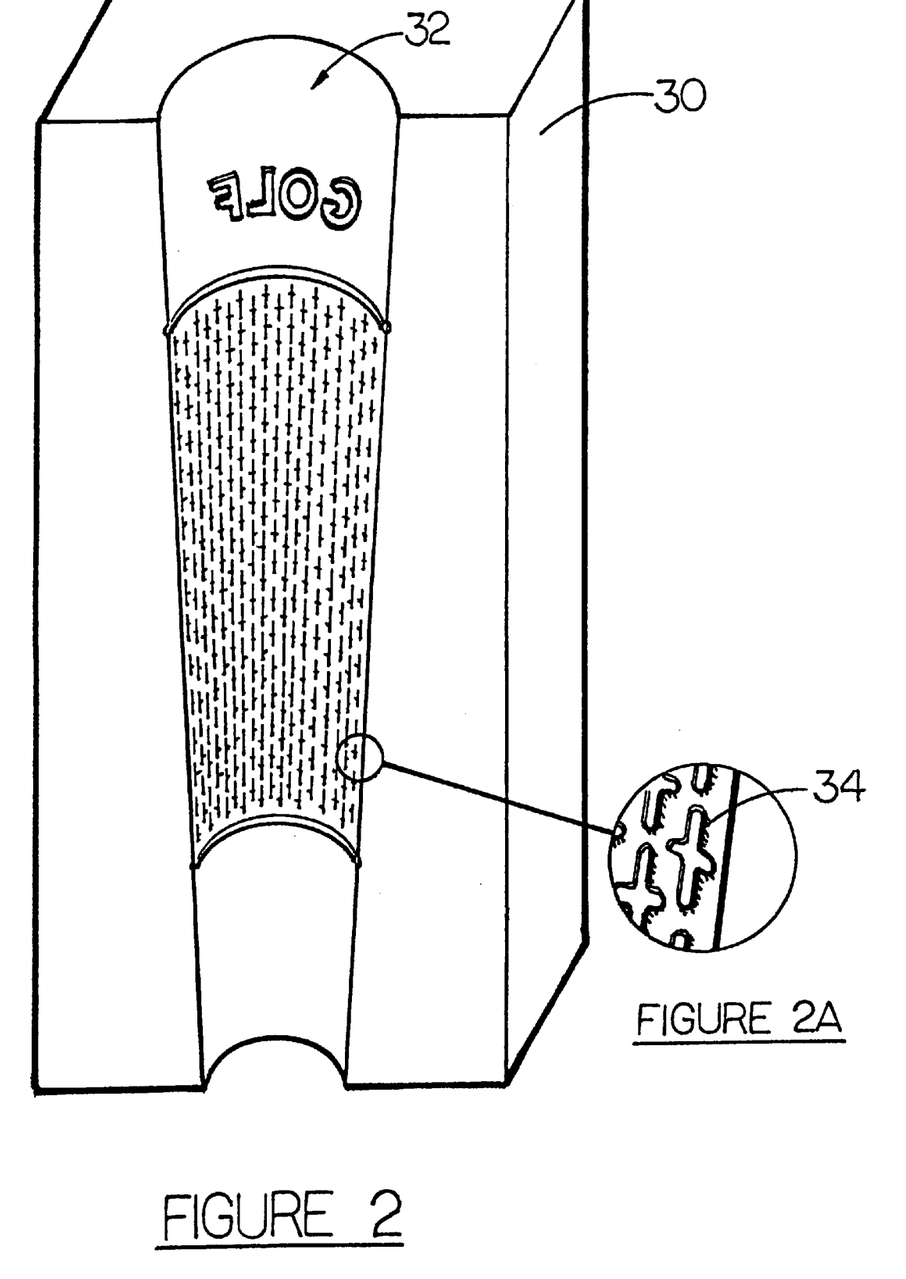
FIG. 2 is a perspective view of a golf club grip mold formed according to the present invention.
FIG. 2A is an enlarged view of one texture feature of a golf club grip mold, magnified to show it is raised from the surface of the mold cavity.

One half of a mold used for casting the golf club grip 10 is depicted in FIG. 2. Grip mold 30 is formed from a block of steel or other suitable material. Formed within grip mold 30 is a cavity 32 of the same general shape as the desired golf club grip 10. A negative image of the surface design for the golf club grip 10 is formed on the surface of cavity 32. This image is "negative," both in the sense that it is a mirror-image of the surface design as it will appear on the golf club grip 10 and additionally, in that the design element features are raised. That is, they extend above the finished surface of the cavity 32, so as to form corresponding indentations in the surface of the golf club grip 10 when it is cast. FIG. 2A depicts a raised design element 34 that will form one of the texture features 20 in the golf club grip 10. According to the present invention, the negative surface design image or design elements are formed in the cavity 32 via EDM machining.

Figure 3:
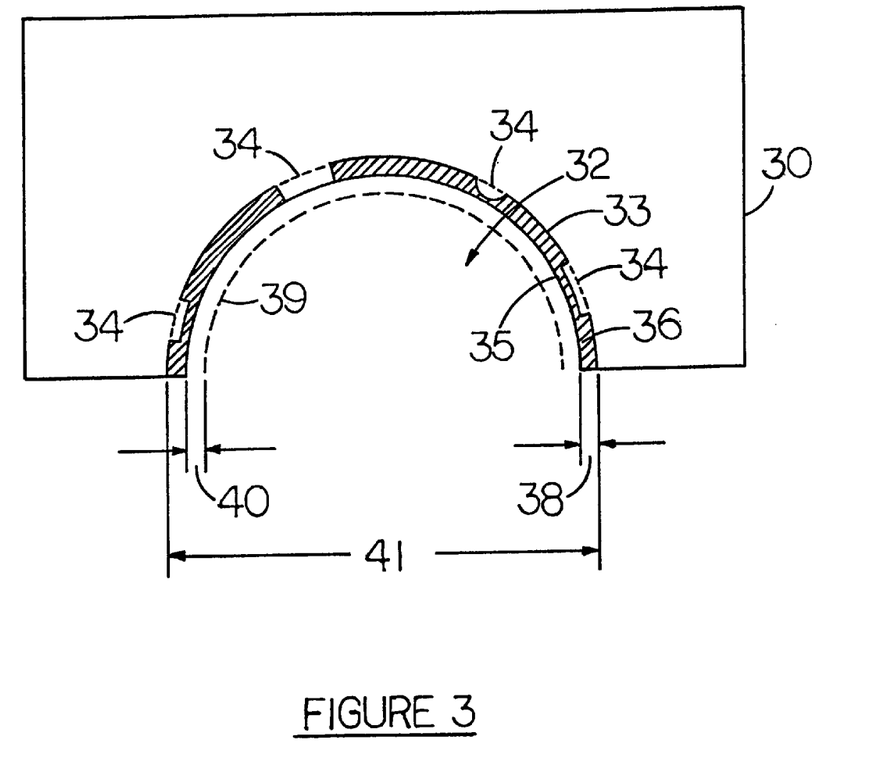
FIG. 3 is a diagrammatic view depicting a thin section of a golf club grip mold.

FIG. 3 depicts the golf club grip mold 30, indicating features prior to the negative image of golf club grip 10 design being formed in the grip mold cavity 32. Cavity 32 may be initially cut into the mold 30 by milling or other appropriate machining operation. This is not necessary, and the entire cavity 32 may be formed via EDM machining. Typically, however, the cavity 32 is "roughed in" via milling or other machining techniques, to an initial surface 35. According to the present invention, EDM machining is then used to selectively enlarge the cavity 32 to a finished surface 33, leaving certain portions of the design elements 34 elevated over the finished surface 33. The excess material in cavity 32 that is cut away in the machining process is depicted by hashed lines, and indicated by the numeral 36. FIG. 3 depicts design elements 34 as they will appear in the finished mold 30. Design elements 34 may, in general, assume any shape. The maximum height for a design element 34, (corresponding to the deepest design element formed into the golf club grip 10) is referred to herein as "feature height," and is indicated by the dimension 38. The maximum feature height is determined by EDM machining constraints.

The dashed line 39 depicts the maximum diameter EDM machining electrode that can be used in cavity 32, as is explained more fully below. The offset of the EDM electrode from the initial surface 35 of the cavity 32 is indicated at dimension 40. The diameter of the cavity 32 is indicated by the dimension 41. It is noted that this dimension is the diameter from one finished surface of the cavity 32 to the other. The difference between the diameter of the cavity 32 and the diameter of the EDM machining electrode is referred to as the electrode "undersize." The electrode undersize is calculated by adding the feature height 38 and offset 40, and multiplying by two.

Figure 4:
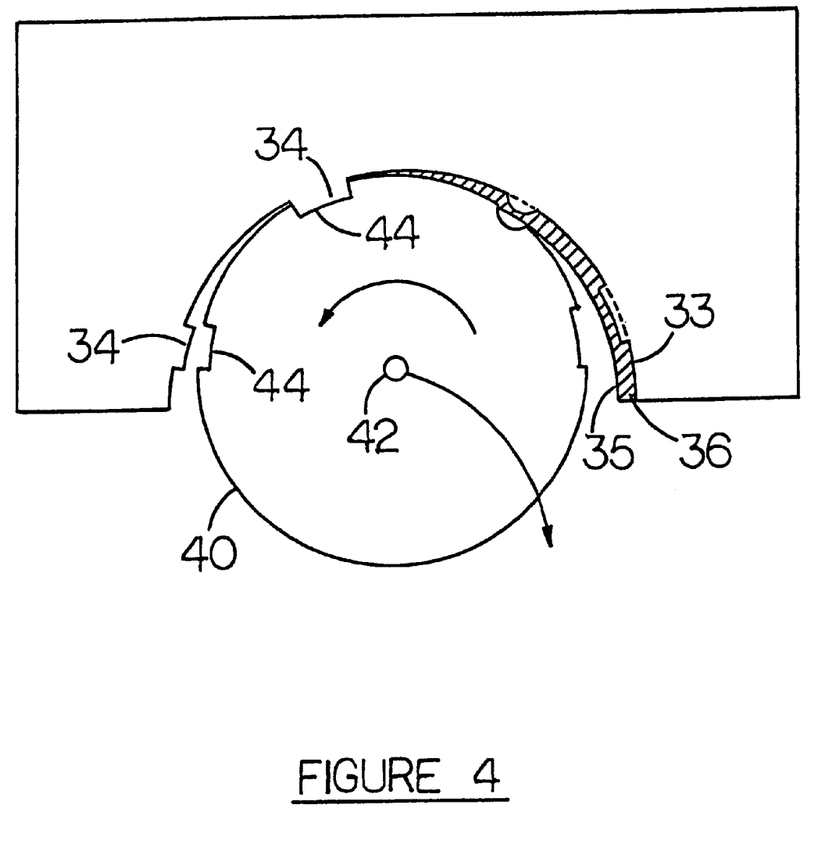
FIG. 4 is a diagrammatic view depicting a thin section of a golf club grip mold and an EDM machining electrode.

The EDM electrode 40 and a partially formed mold 30 are depicted in FIG. 4. Electrode 40 is of the same tapered cylindrical shape as the golf club grip 10, and electrode 40 has cut within its surface the surface design to be reproduced in the golf club grip 10. Electrode 40, however, is of a smaller diameter, at each point along its length, than is golf club grip 10. This reduced diameter facilitates the movement if the electrode 40 within the cavity 32. It will be readily apparent to one of ordinary skill in the art that the EDM electrode 40 cannot be formed with the same diameter as the desired finished diameter 41 of cavity 32. Were this the case, design element features 34 located proximate to the edges of the cavity 32 would be completely burned away along with the excess mold material 36, when the electrode 40 were advanced into and retracted from the cavity 32. Hence, the EMD electrode 40 is formed of a smaller diameter and moved within the cavity 32 in such a way that all design element features 34 can be fabricated. This relative size, and one example of the necessary motion of the electrode 40, are depicted in FIG. 4. According to one embodiment of the present invention, the EDM electrode 40 is "rolled" across the interior surface of cavity 32. This motion comprises both a rotational component and a translational component along an arcuate path, as indicated by arrows on the electrode 40. As EDM electrode 40 is rolled across the surface of the cavity 32, excess material 36 is burned away. Where a design element cut 44 has been formed in the electrode 40, grip mold 30 material is not burned away, leaving design element features 34 raised from the finished surface 33 of the cavity 32.

One of skill in the art will recognize that rolling electrode 40 within the cavity 32 is not the only method by which a design may be transferred from the electrode 40 to the surface of the cavity 32. For example, the electrode could utilize radial stepping, in which the electrode 40 is positioned with its center at the center of the cavity 32, and stepped into and out of the cavity 32 in a radial direction at a given angle, successively incrementing the angle through 180° and radially stepping the electrode at each angular increment. Other techniques of EDM machining may be employed, all of which fall within the scope of the present invention as claimed herein.

The above-disclosed process of EDM machining provides an efficient and cost-effective method for forming an arbitrary, complex surface design in a golf club cavity 32, for the casting of golf club grips 10. However, accurately transferring a golf club grip design to a tapered electrode of a smaller diameter, in such a way that design elements thereof retain their cordal relationship when subsequently cut into a grip mold, remains a significant challenge for which no adequate solution exists in the art. Computer Aided Design (CAD) methods of "unwrapping" a three-dimensional design to a flat representation; linearly scaling the flat design in one or more dimensions; and subsequently "rewrapping" the flat design to a three-dimensional representation, are not apropos to surface designs on a tapered three-dimensional shape. When a tapered cylinder, such as a cone, is unwrapped to a flat representation, the "straight" lines around its circumference, for example, are not straight at all, but curved, along with all the designs elements along such a line. Simple linear scaling of such a design introduces distortion in the spatial relationships of the design elements when the scaled design is rewrapped to a smaller diameter cylinder.

According to the present invention, the three-dimensional surface design for a golf club grip 10 is translated to a smaller diameter (i.e., the diameter of the EDM machining electrode 40) in a manner that preserves the spatial relationship of all elements of the surface design when it is subsequently cut into the cavity 32 by the electrode 40. Specifically, the cordal or circumferential relationship between design elements is preserved by calculating the angle of each element from a reference position, scaling that angle by a scale factor, and locating the scaled or translated element at the scaled angle from the same reference position. The scaled design element is simultaneously relocated to a diameter that places it at the surface of the electrode 40. This angular and radial translation, referred to herein as "cordal scaling," is described more fully below.

Additionally, according to the present invention, the design transformation is simplified, and dimensions of resulting design element feature sizes are more precisely controlled, by reducing some design elements to their corresponding tool paths, and explicitly controlling the associated tool sizes at the electrode 40 machining stage.

Figures 5, 5A:
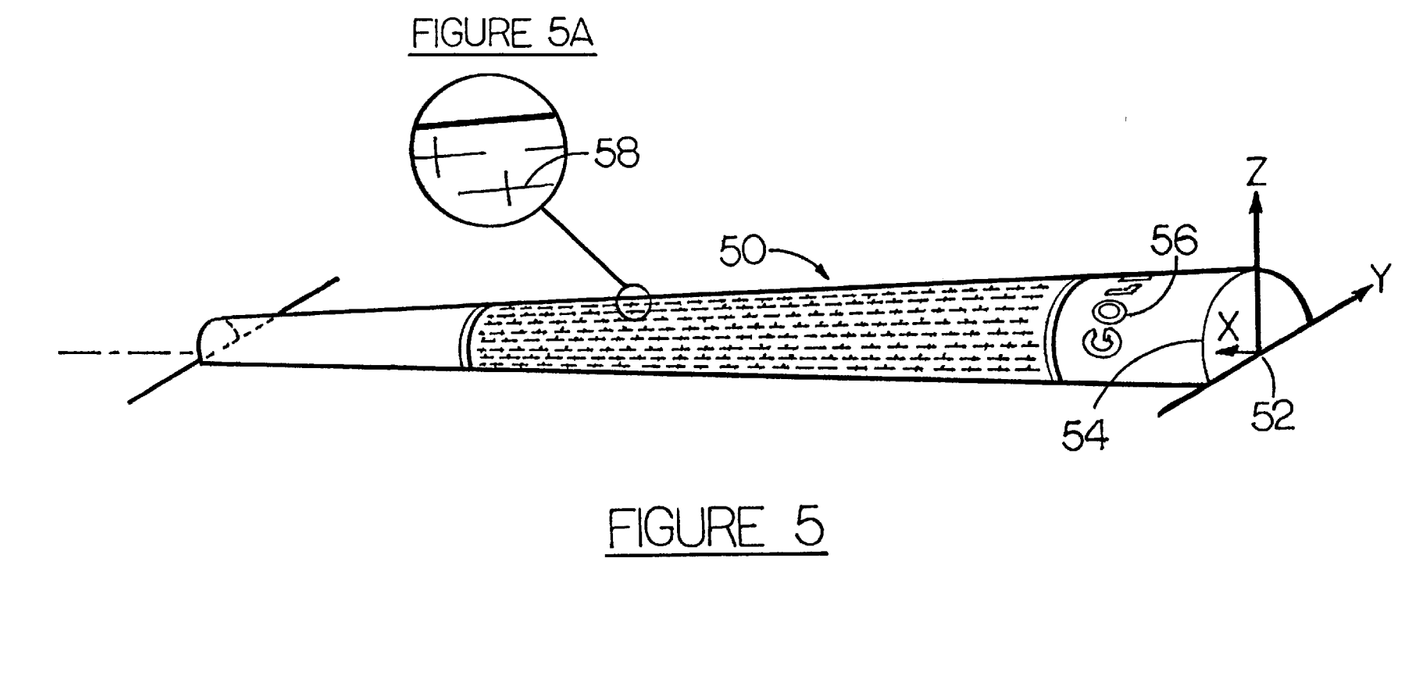
FIG. 5 is a perspective view of a CAD representation of a golf club grip design.
FIG. 5A is an enlarged view of one texture feature of a CAD representation of a golf club grip design, magnified to show it is reduced to two tool path lines.

FIG. 5 depicts a surface design for a golf club grip 10, indicated generally by the numeral 50, as it may be rendered in a three-dimensional CAD computer software program. The CAD design 50 conforms in three-dimensional space to a virtual, cylindrical, tapered surface 54 that is of the same dimensions as the golf club grip 10. The CAD design 50 contains design element 56, which corresponds to the logo 16, and other elements of the surface design of golf club grip 10. Superimposed on the CAD design 50 are three-dimensional Cartesian coordinate axes 52.

CAD system 50 additionally comprises a tool path representation of each texture fixture 20 (see FIG. 1A). As used herein, a "tool path" refers to the path a numeric milling machine would trace to cut a design element into a work piece. For example, the plus-shaped texture features 20 as depicted in FIG. 1A could be produced by tracing the corresponding tool path 58 as depicted in FIG. 5A, using a cutting tool of the appropriate width. This substitution simplifies the design prior to its translation to the EDM electrode. For example, each texture feature 20 as depicted in FIG. 1A comprises eight sides and four half-circles, precisely aligned to describe the two intersecting cuts or trenches. By redefining the texture feature to its tool paths 58 as shown in FIG. 5A, the shape is reduced to two lines, that can be fully described by four endpoints. Thus, the design complexity and volume of data describing it are significantly reduced by translating the surface design to a collection of tool paths that describe the actual design elements. Additionally, the dimensions of the texture feature 20, i.e., the width of each cut, is more precisely controlled by describing a tool path for a numeric milling machine, and separately specifying the associated cutting tool diameter (i.e., the width of each cut or trench in the texture feature 20). In general, all design elements 56 may be represented by tool paths, not only the texture feature elements 58.

According to the present invention, the CAD design 50 is translated to a reduced diameter, while maintaining the cordal or circumferential relationship of all design elements. This allows the design to be transferred to a smaller diameter EDM machining electrode 40, in such a way that the cordal relationship between design elements is preserved when the electrode 40 subsequently cuts the design into the mold cavity 32. This process is explained herein with reference to one exemplary embodiment. Those of skill in the art however, will recognize that the invention may be practiced in a broad variety of ways, utilizing different specific algorithms or mathematical analyses to effect the translation.

In one embodiment of the present invention, the CAD design 50 is translated to a smaller diameter EDM machining electrode 40 by scaling the relative cordal placement of design elements from a reference position according to the cord ratio of the design 50 to the electrode 40. The undersize of the electrode 40, and thus its diameter, is calculated from the feature height 38 and the offset 40 (see FIG. 3A).

At an arbitrary reference point along the length of the CAD design 50 (i.e., along the x-axis as depicted in FIG. 5), the diameter of the design 50 is determined. This corresponds to the diameter 41 of the finished cavity 32 at the corresponding point along its length. The cord length across the surface of the cavity 32 required to contain 180° of the design at that point, $L_C$, is calculated according to the formula:

$$L_C = \frac{\pi(d_C)}{2}$$

The diameter of the electrode at a corresponding point (i.e., at the same distance along the length of the electrode) is calculated by subtracting the undersize from the diameter 41 of the finished cavity 32. The cord length required to accurately represent 180° of the design 50 across the surface of the electrode 40 at that diameter, $L_E$, is calculated as:

$$L_E = \frac{\pi(d_E)}{2}$$

The cord ratio of the cavity 32 to the electrode 40 is then calculated as $$\Re = \frac{L_C}{L_E}$$

It will be noted that, since the diameter 41 of the finished cavity 32 is always greater than the diameter of the electrode 40, this ratio is always greater than one. Thus, the angular coverage necessary to represent 180° of the CAD design 50 on the electrode at any point along its length is 180×$\Re$, which is greater than 180°. In general, a greater angular coverage will be necessary on the electrode to represent the design than the corresponding angular coverage in the cavity 32 or on the golf club grip 10. In other words, the design will "wrap" further around the electrode 40 than around the golf club grip 10. Thus, at least two electrodes are necessary to transfer a full 360° of surface design onto grip molds 30.

It will also be apparent from an inspection of the above equations that the cord ratio could also be expressed as the ratio of the diameters of the cavity 32 to the electrode 40, the ratio of their radii, their circumferences, or other size parameters. The exemplary embodiment of the present invention is discussed in terms of cord length for purpose of greater clarity of explication, but the invention is not thus limited.

Since, at each point along the length of the golf club grip 10, the feature height 38 and offset 40 are the same, the undersize of the electrode 40 relative to the diameter 41 of the cavity 32 is also the same. Thus, while the diameter of the golf club grip 10 changes along its length in a generally arbitrary fashion, the electrode diameter changes correspondingly, and the cord ratio will remain constant. Hence, the cord ratio need only be calculated once, at one arbitrarily chosen point along the length of the golf club grip 10.

Having calculated to the cord ratio, the next step in the translation of CAD design 50 to electrode 40 is to reduce the CAD design 50 to its design primitives. Most modern CAD software programs have the ability to automatically reduce arbitrarily complex designs into one or more selected design primitives. In the exemplary embodiment of the present invention, the design is reduced to lines. Alternatively, the design could be reduced to poly-lines, splines, arcs, or other design primitives. By reducing the design to lines, each design element is fully described by a set of pairs of endpoints. Since the entire CAD surface design 50 lies on a three-dimensional surface, and since the surface of the electrode 40 has a directly corresponding shape, the endpoints of the CAD design 50 may be independently translated to the diameter of the electrode 40, and the endpoints reconnected to re-create the translated design in its design primitives (i.e., lines). An additional advantage to the use of lines as design primitives in this application is that the translated lines may be exported as the tool paths for a numerically controlled milling machine that will actually cut the translated design into the electrode 40.

Figure 6:
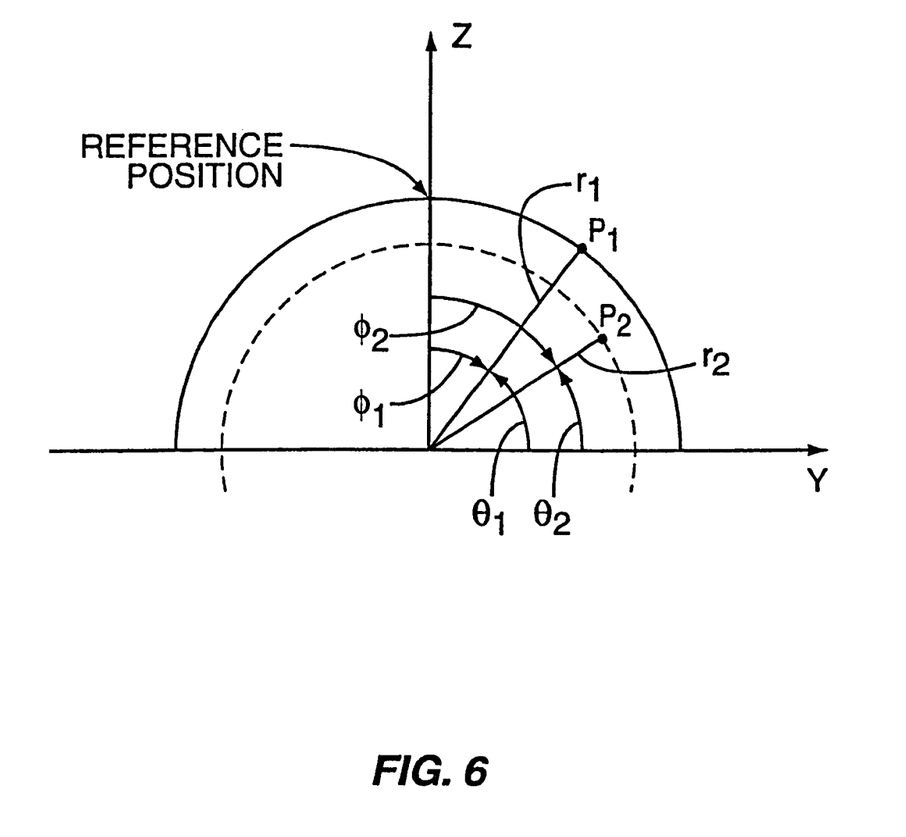
FIG. 6 is a diagrammatic view down the axis of a golf club grip design, depicting the mathematics of translating a point from a golf club grip design to an electrode.

The endpoints in the design primitive representation of CAD design 50 are next independently translated to a surface at a diameter corresponding to that of the EDM electrode 40 via cordal scaling, and subsequently reconnected. This translation preserves the cordal relationship among all other endpoints in the design. The translation process is described with reference to FIG. 6. FIG. 6 depicts a view down the x-axis of the CAD design 50, at a particular x value. The outer circle represents the surface of the golf club grip 10 on which the design 50 lies. The inner circle (dashed line) represents the surface of the electrode 40, onto which the design 50 is to be translated. Point $P_1$ in FIG. 5 corresponds to an endpoint of CAD design 50; point $P_2$ is the translated point (i.e., the corresponding point on the electrode 40). The point $P_1$ is described by the CAD computer software in terms of the Cartesian coordinate axes x, y and z. For the purposes of this translation, the x value is maintained, and new y and z values are determined. $P_1$ ($x_1$, $y_1$, $z_1$), is first converted to polar coordinates: $r_1$, its radius, and $\Theta_1$, its angle with respect to the y-axis:

$$r_1 = \sqrt{y_1^2 + z_1^2}$$

$$\Theta_1 = \tan^{-1}\left(\frac{|z_1|}{|y_1|}\right)$$

Note that the absolute value operators in the second equation above force the angle $\Theta$ to lie in the first quadrant, for ease of subsequent calculation. By noting the sign of the y and z coordinates of $P_1$, appropriate modifications may be made to the equations below to account for this quadrant shift.

The reference position for calculation of cordal relationships among design elements is chosen as the z-axis crossing. The angles cordally scaled are thus those angles with respect to the z-axis. The angle $\Phi_1$ is calculated from $\Theta_1$:

$$\Phi_1 = (90 - \Theta_1)$$

$\Phi_1$ is then scaled by the cord ratio $\Re$ to obtain the angle of $P_2$ with respect to the z-axis:

$$\Phi_2 = \Re \Phi_1$$

The scaled angle $\Theta_2$ with respect to the y-axis is calculated:

$$\Theta_2 = 90 - \Phi_2$$

The radius of $P_1$ is reduced by half of the electrode undersize, to place the point $P_2$ on the surface of electrode 40:

$$r_2 = r_1 - \frac{undersize}{2}$$

The Cartesian coordinates for the translated point $P_2$ ($r_2$, $\Theta_2$) are determined from the trigonometric equations for a right triangle:

$$y_2 = r_2 \cos\Theta_2$$

$$z_2 = r_2 \sin\Theta_2$$

Since the x-axis position is maintained during the translation, $$x_2 = x_1$$

Thus the point $P_2$ ($x_2$, $y_2$, $z_2$) is obtained. Note that for points $P_2$ in the second quadrant, $y_2$ will be negative. Additionally, for some translated points $P_2$, $z_2$ will be negative since, as discussed below, the design will necessarily "wrap" further around the electrode 40 than around the initial CAD design 50.

These calculations are repeated for each endpoint in the CAD design 50. The translated endpoints are then reconnected to regenerate the translated design, and the design is cut into the EDM machining electrode 40. It will be noted that, since the cordal angle of each endpoint was scaled by a factor greater than one, the angular coverage of surface occupied by the translated design on the electrode 40 will be greater than the angular coverage of the surface design in the CAD design 50. In other words, the design will "wrap" further around the electrode 40 than in the design 50. This is indicated in FIG. 6 by the extension of the dotted line representing the electrode design surface extending below the y-axis. With the design 50 translated to the electrode 40 according to the present invention, the original design 50 will be reproduced, with all design elements in their proper cordal relationship, in a negative image on the surface of cavity 32, by EDM machining cavity 32 using electrode 40.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention. The present embodiments are therefore to be construed in all aspects as illustrative and not restrictive and all changes coming within the meaning and equivalency range of the appended claims are intended to be embraced therein.

What is claimed is:

1. A method of producing a cavity for molding a golf club grip and forming a grip design in the surface of the golf club grip, comprising:
   forming a golf club grip design in the surface of an EDM electrode; and
   employing said EDM electrode for cutting a corresponding design in the surface of said cavity.

2. The method of claim 1, wherein forming a golf club grip design in the surface of an EDM electrode comprises transferring a surface design from an initial golf club grip design to said electrode and cutting said transferred surface design into the surface of said electrode.

3. The method of claim 2, wherein the diameter of said electrode is smaller than the corresponding diameter of said initial golf club grip design, and wherein said surface design occupies a greater angular coverage across the surface of said electrode than across the corresponding surface of said initial golf club grip design.

4. The method of claim 3, wherein said initial golf club grip design comprises a plurality of design elements, and wherein transferring said surface design from said initial golf club grip design to said electrode comprises cordally scaling said design elements based on the ratio of a size parameter associated with said initial golf club grip design to a corresponding size parameter associated with said electrode.

5. The method of claim 1, wherein said cutting is performed by simultaneously rotating and translating said electrode within said cavity while engaging in electrical discharge machining.

6. The method of claim 5, wherein translating said electrode comprises moving said electrode in a generally arcuate path within said cavity.

7. The method of claim 1, wherein said cutting is performed by radially stepping said electrode within said cavity.

8. The method of claim 1, wherein forming the golf club grip design in the surface of the EDM electrode comprises:
   selecting two corresponding size parameters, a first parameter associated with the golf club design and a second parameter associated with the EDM electrode;
   determining the ratio of the first size parameter to the second size parameter;
   cordally scaling design elements associated with the golf club grip design by a function of the ratio of size parameters; and
   transferring the scaled design to the EDM electrode.

9. The method of claim 8 wherein the size parameter ratio is greater than 1.

10. The method of claim 8 wherein the two corresponding size parameters are diameters of the cross sectional circles of the golf club grip design and the EDM electrode, respectively.

11. The method of claim 8 wherein the two corresponding size parameters are cord links for a selected angle from a reference position along the surface of the golf club grip design and the electrode respectively.

12. The method of claim 8 wherein cordally scaling the design elements associated with the golf club grip design by a function of the ratio of size parameters comprises, for selected points in the golf club grip design:
   determining a first angle from a reference position to a selected point;
   scaling said first angle by said ratio of size parameters to obtain a second angle; and
   locating a scale point at the second angle from said reference position.

13. The method of claim 1 wherein forming the golf club grip design in the surface of the EDM electrode comprises:
   identifying at least one tool path segment for at least one design element of the golf club grip design; and
   cordally scaling the tool path segment by ratio of a size parameter associated with the golf club grip design to a corresponding size parameter associated with the electrode.

14. The method of claim 13 further comprising cutting the cordally scale tool path segment into the EDM electrode using a cutting tool that is of a dimension corresponding to the at least one design element of the golf club grip design.

15. A data storage medium storing, in a manner readable by a computer, a program for forming a golf club grip design for the surface of an EDM electrode, comprising:

providing a first golf club grip design comprising a plurality of design elements, said first design sized for a golf club grip;

selecting a first size parameter associated with said first golf club design and a corresponding second size parameter associated with said EDM electrode;

determining the ratio of said first size parameter to said second size parameter; and cordally scaling said design elements associated with said first golf club grip design by a function of said ratio of size parameters, to form a second golf club grip design sized for said EDM electrode.

16. The medium of claim 15 further storing a program for transferring said second golf club grip design to the surface of said EDM electrode.

17. The medium of claim 16 wherein said second golf club grip design comprises a plurality of scaled design elements, and wherein transferring said second golf club grip design to the surface of said EDM electrode comprises transmitting coordinates associated with said scaled design elements to a numeric milling machine operative to cut said second golf club grip design into the surface of said EDM electrode.

* * * * *